United States Patent
Mathew et al.

(10) Patent No.: US 8,693,119 B2
(45) Date of Patent: Apr. 8, 2014

(54) ENERGY-BASED INTER-TRACK INTERFERENCE CANCELLATION

(75) Inventors: George Mathew, San Jose, CA (US); Erich Franz Haratsch, Bethlehem, PA (US); Jongseung Park, Allentown, PA (US); Timothy B. Lund, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 1 day.

(21) Appl. No.: 13/591,888

(22) Filed: Aug. 22, 2012

(65) Prior Publication Data

US 2013/0070362 A1   Mar. 21, 2013

Related U.S. Application Data

(63) Continuation-in-part of application No. 13/186,174, filed on Jul. 19, 2011, and a continuation-in-part of application No. 13/186,197, filed on Jul. 19, 2011, and a continuation-in-part of application No. 13/186,213, filed on Jul. 19, 2011.

(51) Int. Cl.
*G11B 27/36* (2006.01)
*G11B 5/00* (2006.01)

(52) U.S. Cl.
USPC .............................. 360/31; 360/50

(58) Field of Classification Search
None
See application file for complete search history.

(56) References Cited

U.S. PATENT DOCUMENTS

| | | |
|---|---|---|
| 2008/0151704 A1* | 6/2008 | Harada ............ 369/30.22 |
| 2009/0135693 A1* | 5/2009 | Kim et al. ............ 369/53.15 |
| 2011/0075292 A1 | 3/2011 | New et al. |
| 2011/0119498 A1 | 5/2011 | Guyot |
| 2012/0105994 A1* | 5/2012 | Bellorado et al. ............ 360/45 |
| 2013/0031406 A1 | 1/2013 | Cho |
| 2013/0170061 A1 | 7/2013 | Saito et al. |
| 2013/0265669 A1 | 10/2013 | Hostetter |

* cited by examiner

Primary Examiner — Daniell L Negron

(57) ABSTRACT

Described embodiments cancel inter-track interference (ITI) from one or more sectors read from a desired track of a storage medium. A read channel reads one or more sectors in the desired track and generates one or more groups of sample values corresponding to each of the sectors. An ITI canceller estimates an ITI response and an ITI signal for each sample value corresponding to (i) a next adjacent track and (ii) a previous adjacent track. If the estimated ITI response of the previous adjacent track reaches a predetermined threshold, the ITI canceller subtracts the estimated ITI signal corresponding to the previous adjacent track from each associated sample value of the desired track. If the estimated ITI response of the next adjacent track reaches a predetermined threshold, the ITI canceller subtracts the estimated ITI signal corresponding to the next adjacent track from each associated sample value of the desired track.

21 Claims, 4 Drawing Sheets

ENERGY-BASED INTER-TRACK INTERFERENCE CANCELLATION

CROSS-REFERENCE TO RELATED APPLICATIONS

This application is a continuation-in-part, and claims the benefit of the filing date, of U.S. patent application Ser. Nos. 13/186,174, 13/186,197 and 13/186,213 all filed Jul. 19, 2011, the teachings of which are incorporated herein in their entireties by reference.

The subject matter of this application is related to U.S. patent application Ser. Nos. 13/591,980, 13/592,023 and 13/591,937, all filed on Aug. 22, 2012, the teachings of all of which are incorporated herein in their entireties by reference.

BACKGROUND

Magnetic and optical data storage devices, such as hard disk drives (HDDs), tape drives and compact disk drives, use heads to read and write information to and from a storage media. In a typical rotating storage system data is stored on a disk in series of adjacent concentric tracks. In a magnetic storage device, the tracks are accessed by read and write heads that move radially over the disk under control of a head-positioning servo mechanism so that the heads can be selectively positioned over a specific track. Once the head is aligned over a track, the servo mechanism causes the heads to ideally follow a center line of the selected track during a read or write operation.

Digital data is written to the storage media in a predetermined format using a write head that induces a magnetic field with sufficient amplitude to record on the magnetic material of the storage device. The magnitude and direction of the magnetic field is modulated to encode information into the magnetic surface of the storage device. The data might then be read as necessary by a read head for processing, for example, by a host computer. In read mode, as the magnetic storage surface moves across the gap in the head, the magnetic field of the storage surface is detected, and a voltage is induced in the head. The analog voltage signal is processed to obtain digital data. For example, the analog voltage might be amplified, filtered, and provided to an analog-to-digital converter (ADC) where the signal is digitized and passed through an equalizer and decoded.

As storage media storage capacities have increased, the data tracks are closer in proximity, increasing storage density and capacity of the media. However, as adjacent data tracks become closer, crosstalk between the adjacent tracks, Inter-Track Interference (ITI), might become increasingly significant, such that data in a desired track cannot be read, leading to data corruption. For example, the read and write heads might be positioned over the storage media by various types of alignment marks that might typically be recorded on the recording disk surface to track and adjust the position of the read and write heads. ITI might be the result of write head positioning error during a write operation, or read head positioning error during a read operation.

In order to detect ITI, typical systems might record tracking marks in one or both adjacent tracks, and read the marks when reading the desired track. ITI cancellation might typically require reading data from the desired track and the side tracks, which requires seeking to the side tracks and waiting for the media to rotate to the position of the tracking marks. Thus, ITI cancellation could introduce system latency to read the desired data from the storage media.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of cancelling inter-track interference (ITI) from one or more sectors read from a desired track of a storage medium. A read channel reads one or more sectors in the desired track and generates one or more groups of sample values corresponding to each of the sectors. An ITI canceller estimates an ITI response and an ITI signal associated with each sample value corresponding to (i) a next adjacent track and (ii) a previous adjacent track. If the estimated ITI response of the previous adjacent track reaches a predetermined threshold, the ITI canceller subtracts the estimated ITI signal corresponding to the previous adjacent track from each associated sample value of the desired track. If the estimated ITI response of the next adjacent track reaches a predetermined threshold, the ITI canceller subtracts the estimated ITI signal corresponding to the next adjacent track from each associated sample value of the desired track.

BRIEF DESCRIPTION OF THE DRAWING FIGURES

Other aspects, features, and advantages of the present invention will become more fully apparent from the following detailed description, the appended claims, and the accompanying drawings in which like reference numerals identity similar or identical elements.

DETAILED DESCRIPTION

Described embodiments provide a method of cancelling inter-track interference (ITI) from one or more sectors read from a desired track of a storage medium. A read channel reads one or more sectors in the desired track and generates one or more groups of sample values corresponding to each of the sectors. An ITI canceller estimates an ITI response and an ITI signal associated with each sample value corresponding to (i) a next adjacent track and (ii) a previous adjacent track. If the estimated ITI response of the previous adjacent track reaches a predetermined threshold, the ITI canceller subtracts the estimated ITI signal response corresponding to the previous adjacent track from each associated sample value of the desired track. If the estimated ITI response of the next adjacent track reaches a predetermined threshold, the ITI canceller subtracts the estimated ITI signal corresponding to the next adjacent track from each associated sample value of the desired track.

TABLE 1

| | | | |
|---|---|---|---|
| ITI | Inter-Track Interference | IC | Integrated Circuit |
| AMBA | Advanced Microcontroller Bus Architecture | APB | Advanced Peripheral Bus |
| AHB | Advanced High-performance Bus | AXI | Advanced eXtensible Interface. |
| NRZ | Non-Return to Zero | HDD | Hard Disk Drive |
| AFE | Analog Front End | FIR | Finite Impulse Response |
| HDC | Hard Disk Controller | SMR | Shingled Magnetic Recording |
| ECC | Error Correction Code | EDC | Error Detection Code |
| VGA | Variable Gain Amplifier | AEQ | Analog EQualizer |
| DFE | Decision Feedback Equalizer | FFE | Feed Forward Equalizer |
| ISI | Inter-Symbol Interference | | |

Figure 1:
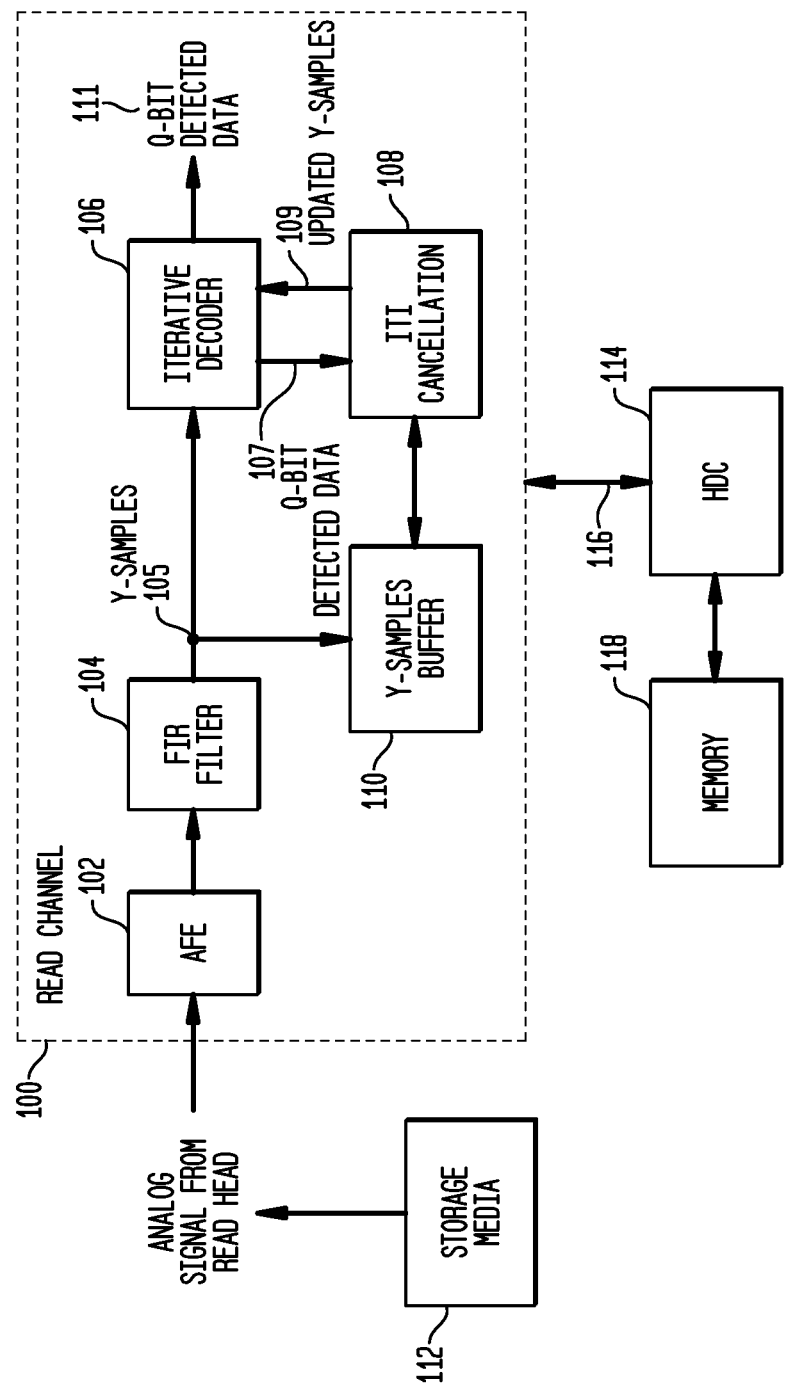
FIG. 1 shows a block diagram of a read channel incorporating inter-track interference (ITI) cancellation in accordance with exemplary embodiments.

FIG. 1 shows a block diagram of read channel 100 for reading data from storage media 112. Read channel 100 might include a physical transmission medium, such as a backplane, one or more coaxial cables, one or more twisted pair copper wires, one or more radio frequency (RF) channels, or one or more optical fibers coupled to the drive head in the magnetic recording system. Described embodiments might be employed in serializer-deserializer (SERDES) communication systems or alternative communications systems employing a transmitter and a receiver communicating over a communication channel. Although described herein as a magnetic storage device such as a hard disk drive (HDD), storage media 112 might be implemented as any storage media having inter-track interference (ITI), such as magnetic tapes, or optical storage media such as compact disks. As shown, read channel 100 receives an analog signal from a read head (not shown) that reads data from storage media 112. The analog signal represents an amplitude of a magnetic field induced in the read head by one or more tracks of storage media 112 (e.g., the desired track, N, and ITI from one or more adjacent tracks, e.g., N+1, N−1, etc.).

Figure 2:
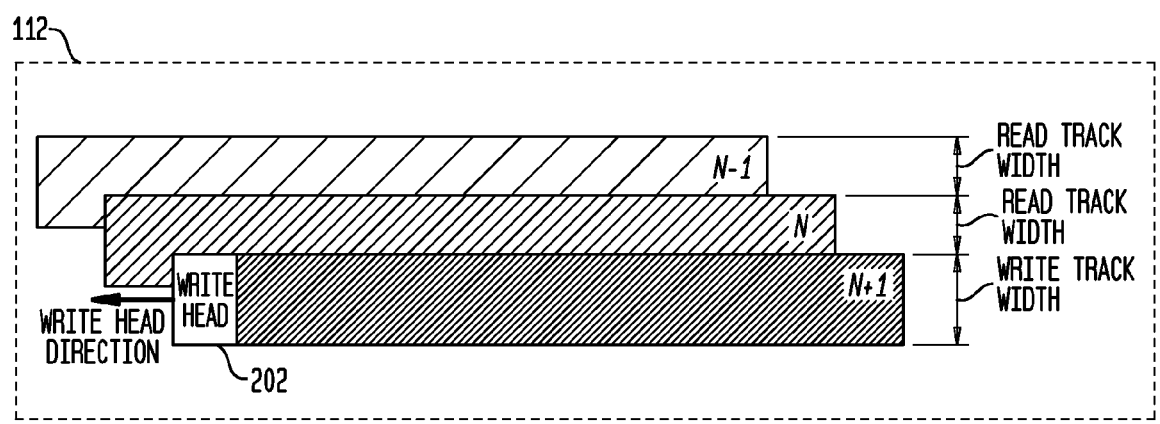
FIG. 2 shows an exemplary diagram of track arrangement on a storage media in communication with the read channel of FIG. 1.

In some embodiments, storage media 112 might store data employing shingled magnetic recording (SMR). SMR increases the storage densities beyond the capacity limits of traditional hard disk drives HDDs employing conventional perpendicular recording. SMR generally requires fewer technology changes to the recording technology than Bit-Patterned Magnetic Recording (BPMR), Energy Assisted Magnetic Recording (EAMR), Heat Assisted Magnetic Recording (HAMR), and Thermally Assisted Magnetic Recording. In SMR drives, track density is increased by writing tracks successively in an overlapped shingled manner as shown in FIG. 2. As shown in FIG. 2, SMR storage media 112 includes a number of written tracks, shown generally as tracks N−1, N and N+1. As shown in FIG. 2, track N−1 is written first, followed by track N, followed by track N+1, and so on, by write head 202 in a given direction on SMR media 112. After the shingled tracks are written, track data is stored in an area ("read track width") that is smaller than the original write area ("write track width"). Thus, in SMR, relatively wider write heads that cover one or more shingled tracks might be employed.

Figure 3A:
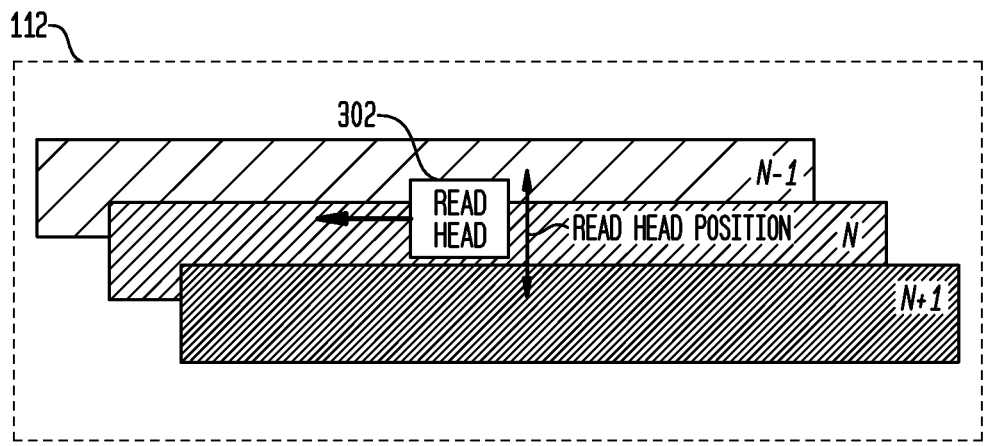
FIG. 3A shows an exemplary diagram of track arrangement on a storage media in communication with the read channel of FIG. 1.
Figure 3B:
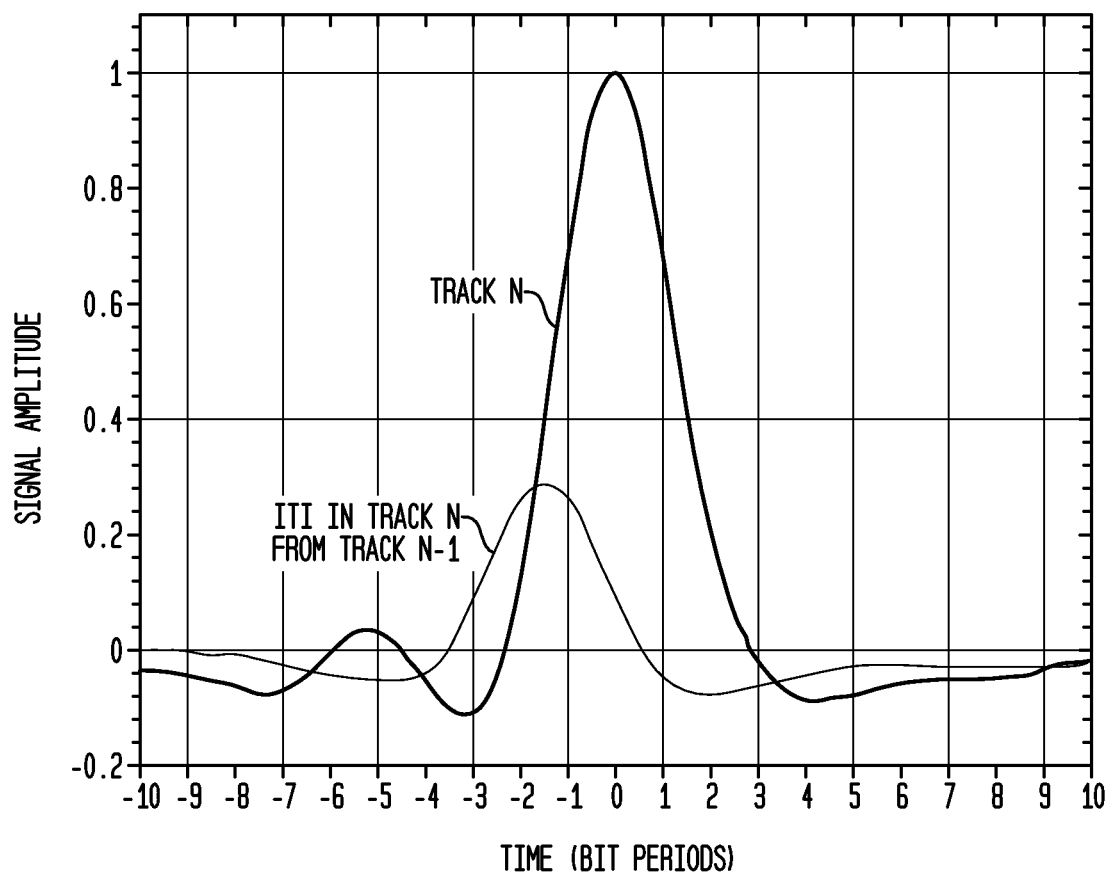
FIG. 3B shows an exemplary plot of read channel signal amplitude of a desired track and ITI from a non-desired track in the read channel of FIG. 1.

However, due to the small read track width, significant ITI from adjacent (or neighboring) tracks might occur during read operations, especially when a read head is employed that is not significantly narrower than the width of the shingled tracks. As shown in FIG. 3A, ITI might occur when the width of read head 302 is greater than the pitch of shingled tracks N−1, N and N+1 on the SMR disk. ITI might also occur due to position errors or offset of read head 302, for example when the read head is not precisely centered over the desired shingled read track (e.g., track N in the exemplary case shown in FIG. 3A). In such cases, read head 302 might receive signals from one or more adjacent (or neighboring) tracks, in addition to the signal from the desired read track, such as shown in the exemplary case of FIG. 3B. As shown in FIG. 3B, read head 302 might receive a first, desired signal, from the desired read track (track N), but might also receive additional, undesired ITI signals, from one or more tracks adjacent to or neighboring the desired read track. For example, as shown in FIG. 3B, an ITI signal is received from neighboring track N−1 that distorts the signal read from track N.

Referring back to FIG. 1, the received analog signal from the read head is provided to analog front end (AFE) 102, which might filter or equalize the analog signal, for example by a variable gain amplifier (VGA) to amplify the analog signal and/or a continuous time analog equalizer (AEQ). AFE 102 might also provide sampling of the received analog signal to provide a digital signal to finite impulse response (FIR) filter 104 that might further condition the signal. Other signal conditioning, such as decision feedback equalization (DFE) and feed forward equalization (FFE) (not shown) might be employed to reduce intersymbol interference (ISI) between one or more adjacent symbols of the received signal. The filtered sample values ("Y-samples" 105) are provided to iterative decoder 106 and inter-track interference (ITI) cancellation module 108 via Y-samples buffer 110.

Iterative decoder 106 receives Y-samples 105 that correspond to the data read from the read track of SMR media 112. Iterative decoder 106 decodes, for example by performing error recovery, one or more sectors read from one or more desired read tracks of SMR media 112. In some embodiments, iterative decoder 106 might average the Y-sample values over multiple reads of given sector(s) of desired read track(s). In some other embodiments, iterative decoder 106 might select a relative "most reliable" set of Y-samples from a group of Y-sample sets corresponding to multiple reads of given sector(s) of desired read track(s). If iterative decoder 106 successfully decodes the sector(s), iterative decoder 106 provides the detected data (Q-bit detected data 111) as the read data for further processing (e.g., to be provided to a host device). If iterative decoder 106 fails to successfully decode the sector(s), iterative decoder 106 provides the detected data (Q-bit detected data 107) to ITI cancellation module 108 to perform ITI cancellation. Thus, ITI cancellation might typically be performed if typical decoding and other decoding retry mechanisms fail to successfully decode a sector. Thus, in described embodiments, ITI cancellation module 108 is a sector-based offline error recovery module.

ITI cancellation module 108 receives data from the desired track, N, and one or more of the adjacent (side) tracks. Equalized Y-samples 105 corresponding to one or more failing target sectors on track N are stored in Y-samples buffer 110. In some embodiments, Y-samples buffer 110 might store up to one 4 kB sector. Non-Return-to-Zero (NRZ) data for adjacent sectors in tracks N−1 and N+1 might be received from iterative decoder 106 by reading storage media 112 using a raw-data mode. The raw-data mode might be a data recovery mode where the data bits recovered from storage media 112 and sent to the host device include data bits, parity bits, formatting bits and other control data. The side track data might take a significant amount of time to collect due to seeking read head 302 to position over the side tracks and waiting for the media to rotate to the correct position for the corresponding sectors. ITI cancellation module 108 estimates, calculates and cancels ITI in the equalized Y-samples for the failed sector(s) on track N using the NRZ data bits from corresponding adjacent sectors in adjacent tracks N−1 and N+1. ITI cancellation module 108 might store ITI-cancelled Y-samples (updated Y-samples 109) in Y-samples buffer 110 and then provide updated Y-samples 109 to iterative decoder 106. Iterative decoder restarts the iterative decoding process using updated Y-samples 109, and provides ITI-cancelled Q-bit detected date 111 as output data, for example to a host device (not shown). Read channel 100 might be coupled to the host device by a Small Computer System interface ("SCSI") link, a Serial Attached SCSI ("SAS") link, a Serial Advanced Technology Attachment ("SATA") link, a Universal Serial Bus ("USB") link, a Fibre Channel ("FC") link, an Ethernet link, an IEEE 802.11 link, an IEEE 802.15 link, an IEEE 802.16 link, a Peripheral Component Interconnect Express (PCI-E) link, or any other similar interface for connecting a peripheral device to a host device.

Although shown in FIG. 1 as included in read channel 100, ITI cancellation module 108 might be included in a separate HDD controller ("HDC") shown as HDC 114. HDC 114 might be coupled to one or more external memories 118 that buffer data being transferred between storage media 112 and the host device. Communications between read channel 100 and HDC 114 might be by one or more channels or buses 116. For example, data read from the storage media might be provided to HDC 114 over an NRZ data bus, and Y-samples for one or more sectors might be provided to HDC 114 from Y-samples buffer 110 by an Advanced Peripheral Bus (APB).

Since, in described embodiments, ITI cancellation module 108 employs the NRZ data for at least one of adjacent tracks N−1 and N+1, media 112 might generally make multiple disk revolutions in order for ITI cancellation module 108 to recover failing sector(s) of desired track N. For example, three disk revolutions might be needed to transfer data samples for track N and the NRZ data for adjacent tracks N−1 and N+1 from media 112 to ITI cancellation module 108. Additional revolutions of media 112 might occur during ITI cancellation before iterative decoder 106 restarts processing on the updated Y-samples.

As described in related U.S. patent application Ser. Nos. 13/591,980, 13/592,023 and 13/591,937, all filed on Aug. 22, 2012, incorporated by reference herein, for many SMR implementations, it might be known which side track (e.g., either N+1 or N−1) has dominant interference. Thus, in many instances, for described embodiments, there is a high likelihood that the desired data from track N might be successfully recovered after cancelling interference from only the dominant side track. If the data cannot be recovered after cancellation of interference from the dominant side track, cancellation of interference from the non-dominant side track might be performed.

In an SMR system such as shown in FIG. 1, the analog output signal of the read head can be represented by relation (1):

$$r(t) = r_0(t) + r^-(t) + r^+(t) \quad (1)$$

where $r_0(t)$ is the output signal of the read head for a desired track N without any ITI from adjacent tracks, and $r^-(t)$ and $r^+(t)$ are interfering signals picked up by the read head (e.g., ITI) from a previous track N−1 and a next track N+1, respectively. The objective is for ITI cancellation module 108 to estimate and remove ITI components $r^-(t)$ and $r^+(t)$ from the signal for the desired track. The output values for each track, in terms of NRZ bit values, can be represented by relations (2a-c):

$$r_0(t) = \sum_k a_0[k] h_0(t - kT) \quad (2a)$$

$$r^-(t) = \sum_k a^-[k] h^-(t - kT + \tau^-) \quad (2b)$$

$$r^+(t) = \sum_k a^+[k] h^+(t - kT + \tau^+) \quad (2c)$$

where $\tau^-$ and $\tau^+$ are phase offsets between data bits on the desired track N and data bits on the previous track N−1 and the next track N+1, respectively; $a_0[n]$, $a^-[n]$ and $a^+[n]$ are NRZ data bits written on the desired track N, the previous track N−1 and the next track N+1, respectively; $h_0(t)$, $h^-(t)$ and $h^+(t)$ are the pulse responses from the desired track N, the previous track N−1 and the next track N+1, respectively; and T is the bit period. Typically, data bits $a_0[n]$, $a^-[n]$ and $a^+[n]$ are mutually uncorrelated.

Based on relations (2a-c), the digitally sampled data (e.g., Y-samples 105) might be represented by relations (3a-b):

$$r[n] = \sum_k a_0[k] g_0[n-k] + \sum_k a^-[k] g^-[n-k] + \sum_k a^+[k] g^+[n-k] \quad (3a)$$

where $$g_0[k] = h_0(kT), \ g^-[k] = h^-(kT + \tau^-), \ g^+[k] = h^+(kT + \tau^+) \quad (3b)$$

Thus, the ITI due to sampled data for the previous track and the next track contains the phase offsets of the adjacent tracks versus the desired track, as shown in relations (3a-b). Described embodiments might estimate ITI response by correlating $r[n]$ with $a^-[n]$ and $a^+[n]$ as given in relation (4):

$$g^-[k] = E\{r[n] \cdot a^-[n-k]\}$$

and $$g^+[k] = E\{r[n] \cdot a^+[n-k]\} \quad (4)$$

where $E\{\cdot\}$ denotes a statistical expectation operator. Since the phase offsets of the adjacent tracks from the desired track are included in the ITI response, the correlation shown in relation (4) might be implemented by time-averaging.

Once the ITI response $\{g^-[k], g^+[k]\}$ is determined, ITI signals might be estimated by convolving the ITI response with data bits from the respective tracks. The estimated ITI signal $\{\hat{r}^-[n], \hat{r}^+[n]\}$ is subtracted from readback signal $r[n]$ to recover the data for the desired track as given by relations (5a-b):

$$\hat{r}_0[n] = r[n] - \hat{r}^-[n] - \hat{r}^+[n] \quad (5a)$$

$$\text{where } \hat{r}^-[n] = \sum_{k=-M}^{M} g^-[k] a^-[n-k], \text{ and} \quad (5b)$$

$$\hat{r}^+[n] = \sum_{k=-M}^{M} g^+[k] a^+[n-k]$$

where 2M+1 represents a length of ITI filters $\{g^-[k], g^+[k]\}$ and $\hat{r}_0[n]$ is the data signal recovered after the estimated ITI signal is removed from the readback signal. The length of the ITI filters (e.g., 2M+1) should beneficially be large enough to account for phase offsets $\tau^-$ and $\tau^+$ of adjacent tracks compared to the desired track.

Based on relations (4) and (5a-b), ITI cancellation module 108 might perform ITI cancellation substantially as described in related U.S. patent application Ser. Nos. 13/186,174, 13/186,197 and 13/186,213 all filed Jul. 19, 2011, and Ser. Nos. 13/591,980, 13/592,023 and 13/391,937, filed on Aug. 22, 2012, the teachings of which are incorporated by reference in their entireties herein. For example, some embodiments might employ block-wise ITI processing as described in related U.S. patent application Ser. Nos. 13/186,174, 13/186,197 and 13/186,213 all filed Jul. 19, 2011. In block-wise ITI processing, such as described in related U.S. patent application Ser. Nos. 13/186,174, 13/186,197 and 13/186,213, ITI filters having length 2M+1 might be employed to estimate ITI. However, in some embodiments, an initial phase offset between the desired track and the adjacent tracks might be estimated using ITI filters having a longer length, such as $2\tilde{M}+1$, where $\tilde{M}>M$. In block-wise ITI processing, the output of FIR filter 104 (e.g., Y-samples 105) might be segmented into one or more blocks, with each block containing $L_b$ samples. Each of Y-samples 105 in a given block (denoted y[n]) might also have corresponding NRZ data values (denoted $\alpha[n]$). The adjacent tracks have corresponding interfering NRZ values (denoted $\alpha^+[n]$ and $\alpha^-[n]$). The values y[n], $\alpha^+[n]$ and $\alpha^-[n]$ might typically be made available to ITI cancellation module 108.

As described herein, data read from a desired track might include ITI noise from adjacent tracks, as well as other noise and interference from other sources (e.g., ISI, etc.). Although intended to improve the quality of data read from a desired track, performing ITI cancellation, in some instances, might actually degrade the read data. Described embodiments might first estimate an energy level of ITI before performing ITI cancellation. Based on the energy estimate, ITI cancellation module 108 might determine whether to perform ITI cancellation. If the estimated energy level of ITI is relatively small, ITI cancellation might not be performed, thus reducing latency and processing by read channel 100 and lessening the likelihood of degrading read data during ITI cancellation.

Figure 4:
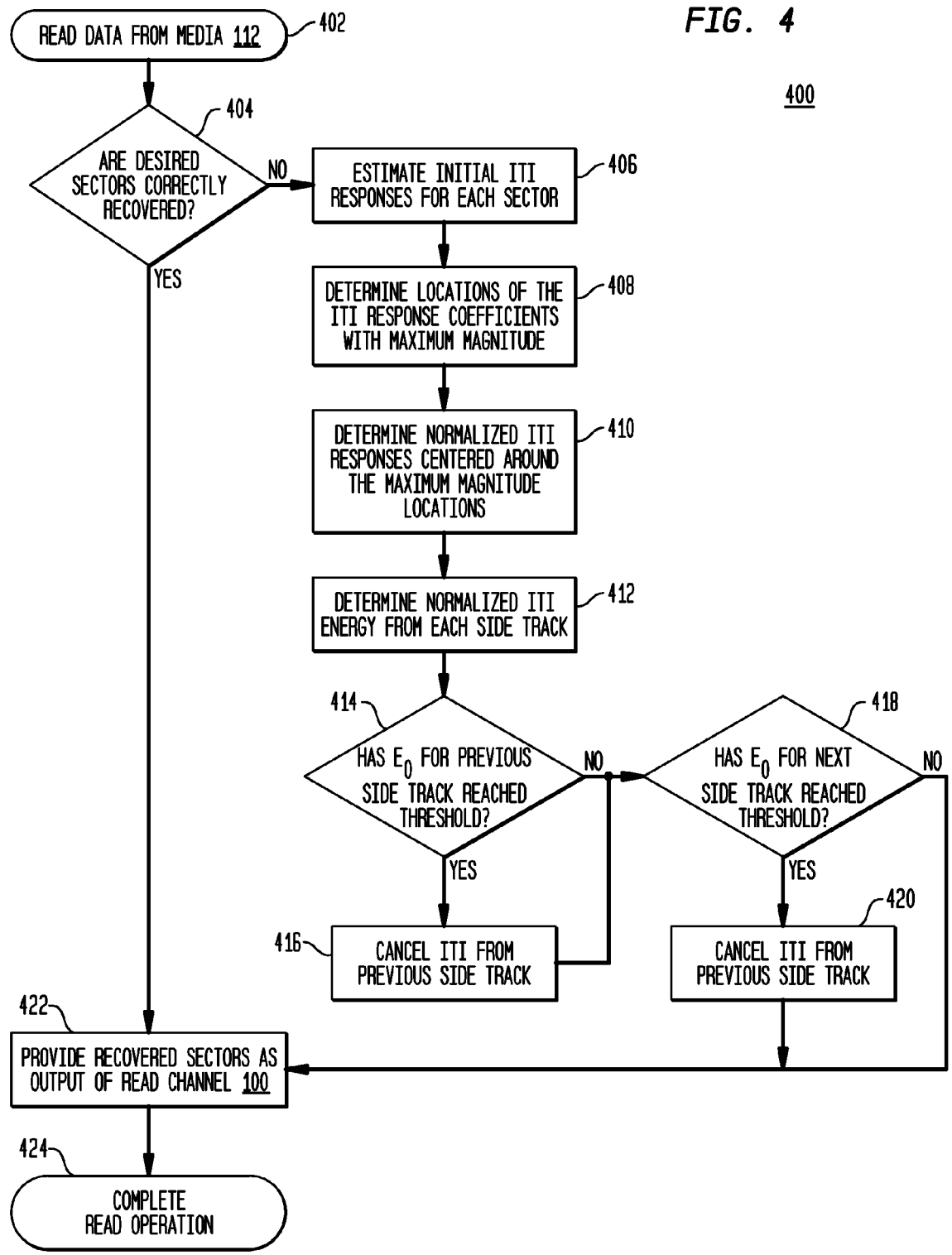
FIG. 4 shows a flow diagram of an ITI cancellation routine in accordance with exemplary embodiments.

FIG. 4 shows a flow diagram of data recovery process 400. At step 402, one or more data sectors are read from media 112. At step 404, if all of the data sectors read at step 402 are correctly recovered, process 400 proceeds to step 422 to provide the recovered sectors as the output of read channel 100, and at step 424, data recovery process 400 completes. At step 404, if one or more of the data sectors read at step 402 are incorrectly recovered, process 400 proceeds to step 406. At step 406, ITI cancellation module 108 might estimate initial ITI responses for each sector, or a block of multiple sectors. For block-wise ITI processing, estimated un-normalized ITI responses from a first block might be estimated by relations (6a-b):

$$g_0^-[i] = \sum_{l=1}^{\tilde{L}_b} z_1[l] a^-[l-i-\delta_0^-] \tag{6a}$$

$$g_0^+[i] = \sum_{l=1}^{\tilde{L}_b} z_1[l] a^+[l-i-\delta_0^+] \tag{6b}$$

where $z_1$ is either (a) the output of FIR filter 104 (e.g., Y-samples 105), or (b) an error sequence generated by FIR filter 104, $i=-\tilde{M} \ldots \tilde{M}$, with the block length for initial ITI estimation $\tilde{L}_b \leq L_b$ where $L_b$ is the block length for regular ITI estimation (e.g., not the first block), and where $\delta_0$ represents an initial approximate phase offset for the adjacent tracks relative to the desired track. In some embodiments, $\tilde{M}=25$ and $\tilde{L}_b=2000$.

At step 408, ITI cancellation module determines locations of the estimated ITI response having a maximum magnitude. If $k_0^-$ and $k_0^+$ represent locations in estimated ITI response $g_0^-[i]$ and $g_0^+[i]$ having a maximum ITI magnitude (e.g., $\{k_0^-, k_0^+\} \in \{1, 2, \ldots, 2\tilde{M}+1\}$), then at step 410, ITI cancellation module 108 might determine normalized ITI responses of length 2M+1 centered around the $k_0^-$ and $k_0^+$ coefficients of maximum magnitude. The normalized ITI responses are given in relations (7a-b):

$$\tilde{g}_0^-[i] = \frac{1}{L_b} \cdot g_0^-[k_0^- + i + k_d^-] \tag{7a}$$

$$\tilde{g}_0^+[i] = \frac{1}{L_b} \cdot g_0^+[k_0^+ + i + k_d^+] \tag{7b}$$

where $i=-M, \ldots, M$. Some embodiments might typically employ M=5, $\{k_d^-, k_d^+\}$ are factors to adjust for the maximum magnitude coefficients $k_0^-$ and $k_0^+$ being near the beginning or end of the estimated initial ITI response (e.g., near the $\pm\tilde{M}$ phase offset). $\{k_d^-, k_d^+\}$ are defined by relations (8a-b):

$$\begin{aligned}
k_d^-[i] &= 0 && \text{if } k_0^- \geq M+1 \text{ or } k_0^- \leq M_d \\
&= M+1-k_0^- && \text{if } k_0^- < M+1 \\
&= M_d - k_0^- && \text{if } k_0^- > M_d
\end{aligned} \tag{8a}$$

$$\begin{aligned}
k_d^+[i] &= 0 && \text{if } k_0^+ \geq M+1 \text{ or } k_0^+ \leq M_d \\
&= M+1-k_0^+ && \text{if } k_0^+ < M+1 \\
&= M_d - k_0^+ && \text{if } k_0^+ > M_d
\end{aligned} \tag{8b}$$

where $M_d = 2\tilde{M}+1-M$.

At step 412, ITI cancellation module 108 determines the normalized ITI energy from each side track. The normalized energy in the ITI filters can be determined by relations (9a-c):

$$E_0^- = \frac{1}{E_b} \sum_{i=-M}^{M} (\tilde{g}_0^-[i])^2 \tag{9a}$$

$$E_0^+ = \frac{1}{E_b} \sum_{i=-M}^{M} (\tilde{g}_0^+[i])^2 \tag{9b}$$

$$\text{with } E_b = \sum_{i=0}^{N_g} g^2[i] \tag{9c}$$

where $\{g[0], g[1], \ldots, g[N_g]\}$ represents a partial response ("PR") equalization target of FIR filter 104 employed for equalization of read data of the desired track of media 112. $N_g$ is the number of coefficients in the partial response target.

In some embodiments, ITI cancellation module 108 might only perform ITI cancellation if $E_0^+$ and $E_0^-$ reach or exceed an ITI threshold, $\theta_0$. For example, in some embodiments, read data segments containing 8% or greater ITI (corresponding to $\theta_0=0.005$) might desirably have ITI cancellation performed (e.g., by ITI cancellation module 108) to improve accuracy of the read data, while read data segments containing less than 8% ITI might provide the read data as the output of read channel 100 without performing ITI cancellation.

At step 414, if the ITI energy from the previous side track, $E_0^-$, has reached or exceeded a predetermined ITI threshold, $\theta_0$, then at step 416, ITI cancellation module 108 estimates and cancels ITI due to the previous side track from the read data, and process 400 continues to step 418. If, at step 414, the ITI energy from the previous side track, $E_0^-$, has not reached the predetermined ITI threshold, $\theta_0$, then process 400 continues to step 418 without performing ITI cancellation for the previous side track.

In some embodiments, ITI cancellation module 108 might estimate ITI signals corresponding to the previous side track substantially as described in U.S. patent application Ser. Nos. 13/186,174, 13/186,197 and 13/186,213 all filed Jul. 19, 2011, of which this application is a continuation-in-part. For example, ITI cancellation module 108 might estimate ITI signals corresponding to the previous side track and the next side track for the mth block of samples in a given sector as shown in relations (10a-b):

$$\hat{r}_m^-[l] = \sum_{i=-M}^{M} \tilde{g}_m^-[i]a^-[(m-1)L_b + l - i - \delta_m^-] \quad \text{if } \max\{|\tilde{g}_m^-[i]|\} > \theta_0 \quad (10a)$$
$$= 0 \quad \text{otherwise}$$

$$\hat{r}_m^+[l] = \sum_{i=-M}^{M} \tilde{g}_m^+[i]a^+[(m-1)L_b + l - i - \delta_m^+] \quad \text{if } \max\{|\tilde{g}_m^+[i]|\} > \theta_0 \quad (10b)$$
$$= 0 \quad \text{otherwise}$$

for l=1, 2, . . . , $L_b$, where m is the sample block number, max $\{\tilde{g}_m^-[i]\}$ and max $\{\tilde{g}_m^+[i]\}$ represent the maximum ITI magnitude $\alpha^+$ and $\alpha^-$ represent corresponding interfering NRZ values of the adjacent tracks, $L_b$ is the block length for ITI estimation, and $\delta_m$ represents a phase offset for the adjacent tracks relative to the desired track. In some embodiments, the maximum ITI magnitude might be employed, as shown above in relations (10a-b). In other embodiments, the normalized energy of the ITI response might be employed, which, as described herein, might be independent of the phase of the ITI response. Thus, relations (10a-b) might be modified as shown in relations (11a-b):

$$\hat{r}_m^-[l] = \sum_{i=-M}^{M} \tilde{g}_m^-[i]a^-[(m-1)L_b + l - i - \delta_m^-] \quad \text{if } E_0^-[m] \geq \theta_0 \quad (11a)$$
$$= 0 \quad \text{otherwise}$$

$$\hat{r}_m^+[l] = \sum_{i=-M}^{M} \tilde{g}_m^+[i]a^+[(m-1)L_b + l - i - \delta_m^+] \quad \text{if } E_0^+[m] \geq \theta_0 \quad (11b)$$
$$= 0 \quad \text{otherwise}$$

for l=1, 2, . . . , $L_b$, where m is the sample block number, $\alpha^+$ and $\alpha^-$ represent corresponding interfering NRZ values of the adjacent tracks, $L_b$ is the block length for ITI estimation, and $\delta_m$ represents a phase offset for the adjacent tracks relative to the desired track, and $E_0^-[m]$ and $E_0^+[m]$ represent the normalized ITI energy determined at step 412 as given by relations (12a-b):

$$E_0^-[m] = \frac{1}{E_b} \sum_{i=-M}^{M} (\tilde{g}_m^-[i])^2 \quad (12a)$$

$$E_0^+[m] = \frac{1}{E_b} \sum_{i=-M}^{M} (\tilde{g}_m^+[i])^2 \quad (12b)$$

At step 418, if the ITI energy from the next side track, $E_0^+$, has reached or exceeded a predetermined ITI threshold, $\theta_0$ (e.g., relation 12b), then at step 420, ITI cancellation module 108 estimates and cancels ITI due to the next side track from the read data (e.g., as given by relations 10b or 11b), and process 400 continues to step 422. ITI cancellation module 108 might estimate the ITI for the next side track substantially as described above regarding step 416. If, at step 418, the ITI energy from the next side track, $E_0^+$, has not reached the predetermined ITI threshold, $\theta_0$, then process 400 continues to step 422 without performing ITI cancellation for the next side track.

Based on relations (10a-b), (11a-b) and (12a-b), the ITI cancelled data for the mth block of samples in a given sector as shown in relation (13):

$$\hat{y}_m[l] = y_m[l] - (\hat{r}_m^-[l] + \hat{r}_m^+[l]) \quad (13)$$

where $y_m[l]$ is the mth block of samples output by FIR filter 104 (shown in FIG. 1 as Y-samples 105), and $\hat{y}_m[l]$ is the ITI processed data for the mth block of samples (shown in FIG. 1 as updated Y-samples 109). At step 422 the sectors (e.g., either the original read data sectors if no ITI cancellation is performed, or updated Y-samples 109, if ITI from one or both side tracks is selectively performed) are provided to iterative decoder 106, which generates and provides detected data as the output of read channel 100, for example to a host device (not shown). At step 424, data recovery process 400 completes.

Thus, as described herein, described embodiments provide a method of cancelling inter-track interference (ITI) from one or more sectors read from a desired track of a storage medium. A read channel reads one or more sectors in the desired track and generates one or more groups of sample values corresponding to each of the sectors. An ITI canceller estimates an ITI response and an ITI signal associated with each sample value corresponding to (i) a next adjacent track and (ii) a previous adjacent track. If the estimated ITI response of the previous adjacent track reaches a predetermined threshold, the ITI canceller subtracts the estimated ITI signal corresponding to the previous adjacent track from each associated sample value of the desired track. If the estimated ITI response of the next adjacent track reaches a predetermined threshold, the ITI canceller subtracts the estimated ITI signal corresponding to the next adjacent track from each associated sample value of the desired track.

While the exemplary embodiments have been described with respect to processes of circuits, including possible implementation as a single integrated circuit, a multi-chip module, a single card, or a multi-card circuit pack, the present invention is not so limited. As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

Transistors are typically shown as single devices for illustrative purposes. However, it is understood by those skilled in the art that transistors will have various sizes (e.g., gate width and length) and characteristics (e.g., threshold voltage, gain, etc.) and might consist of multiple transistors coupled in parallel to get desired electrical characteristics from the combination. Further, the illustrated transistors might be composite transistors.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of cancelling inter-track interference (ITI) from one or more sectors read from a desired track of a storage medium, the method comprising:
   reading, by a read channel, one or more sectors in a desired track of the storage medium;
   generating one or more groups of sample values corresponding to each of the sectors;
   estimating, by an ITI canceller of the read channel, an un-normalized ITI response and an ITI signal associated with each sample value corresponding to (i) a next adjacent track and (ii) a previous adjacent track;
   if the estimated ITI response of the previous adjacent track has reached a predetermined threshold:
     subtracting, by the ITI canceller, the estimated ITI signal corresponding to the previous adjacent track for each sample value from each associated sample value of the desired track; and
   if the estimated ITI response of the next adjacent track has reached a predetermined threshold:
     subtracting, by the ITI canceller, the estimated ITI signal corresponding to the next adjacent track for each sample value from each associated sample value of the desired track,
   wherein the estimated un-normalized ITI response for each group of samples is based on the sum of each sample value multiplied by a corresponding bit value for the corresponding adjacent track averaged over the number of samples included in each group of samples as determined by, and wherein the corresponding bit value for the corresponding adjacent track is adjusted for a phase offset between the corresponding adjacent track and the desired track, wherein the estimated un-normalized ITI response for each group of samples is determined by $$g_0^-[i] = \sum_{l=1}^{\tilde{L}_b} z[l]a^-[l-i-\delta_0^-]$$

for the previous adjacent track, and $$g_0^+[i] = \sum_{l=1}^{\tilde{L}_b} z[l]a^+[l-i-\delta_0^+]$$

for the next adjacent track, where $z[l]$ is the corresponding sample value, $i=-\tilde{M} \ldots \tilde{M}$, where $2\tilde{M}+1$ is a length of one or more ITI filters of the read channel, where $\tilde{L}_b$ is a number of samples in the group of samples, and where $\delta_0$ is a phase offset for each adjacent track relative to the desired track.

2. The method of claim 1, wherein the step of estimating, by an ITI canceller of the read channel, an un-normalized ITI response corresponding to (i) a next adjacent track and (ii) a previous adjacent track, the ITI responses associated with each sample value further comprises:
   determining, within each group of sample values, (i) a maximum ITI response value corresponding to the previous adjacent track, and (ii) a maximum ITI response value corresponding to the next adjacent track; and
   providing the maximum ITI response values for the estimated ITI response corresponding to each adjacent track.

3. The method of claim 1, further comprising:
   determining, based on the determined maximum ITI response value corresponding to the previous adjacent track and the maximum ITI response value corresponding to the next adjacent track, a normalized ITI response for each respective adjacent track; and
   providing the normalized ITI response values as the estimated ITI response corresponding to each adjacent track.

4. The method of claim 3, comprising:
   determining the normalized ITI response values by normalizing, by the number of samples in each sample group, the determined un-normalized ITI response value for each side track, the determined un-normalized ITI response value for each side track adjusted by the sample number and at least one adjustment factor.

5. The method of claim 4, comprising determining the normalized ITI response values by $$\tilde{g}_0^-[i] = \frac{1}{\tilde{L}_b} \cdot g_0^-[k_0^- + i + k_d^-]$$

for the previous adjacent track and $$\tilde{g}_0^+[i] = \frac{1}{\tilde{L}_b} \cdot g_0^+[k_0^+ + i + k_d^+]$$

for the next adjacent track, where i=−M, . . . , M, where $k_0^-$ and $k_o^+$ are the determined maximum ITI response value for each side track, and where $k_d^-$ and $k_d^+$ are adjustment factors.

6. The method of claim 5, comprising determining adjustment factors $k_d^-$ and $k_d^+$ by:

$$k_d^-[i] = 0 \quad \text{if } k_0^- \geq M+1 \text{ or } k_0^- \leq M_d$$
$$= M+1-k_0^- \quad \text{if } k_0^- < M+1$$
$$= M_d - k_0^- \quad \text{if } k_0^- > M_d$$
$$k_d^+[i] = 0 \quad \text{if } k_0^+ \geq M+1 \text{ or } k_0^+ \leq M_d$$
$$= M+1-k_0^+ \quad \text{if } k_0^+ < M+1$$
$$= M_d - k_0^+ \quad \text{if } k_0^+ > M_d$$

where $M_d = 2\tilde{M}+1-M$.

7. The method of claim 6, comprising determining normalized ITI energy by:

$$E_0^- = \frac{1}{E_b} \sum_{i=-M}^{M} (\tilde{g}_0^-[i])^2$$

for the previous adjacent track, $$E_0^+ = \frac{1}{E_b} \sum_{i=-M}^{M} (\tilde{g}_0^+[i])^2$$

for the next adjacent track, where $$E_b = \sum_{i=0}^{N_g} g^2[i],$$

where {g[0], g[1], . . . , g[$N_g$]} is a partial response equalization target of a finite impulse response filter of the read channel, and where $N_g$ is a number of coefficients in the partial response target.

8. The method of claim 7, wherein:
if the estimated ITI response of the previous adjacent track has reached a predetermined threshold:
the estimated ITI signal corresponding to the previous adjacent track for each sample value is given by $$\hat{r}_m^-[l] = \sum_{i=-M}^{M} \tilde{g}_m^-[i] a^- [(m-1)L_b + l - i - \delta_m^-];$$

and
if the estimated ITI response of the next adjacent track has reached a predetermined threshold:
the estimated ITI signal corresponding to the next adjacent track for each sample value is given by $$\hat{r}_m^+[l] = \sum_{i=-M}^{M} \tilde{g}_m^+[i] a^+ [(m-1)L_b + l - i - \delta_m^+];$$

wherein l=1, 2, . . . , $L_b$, where m is the sample block number, $\tilde{g}_m^-[i]$ and $\tilde{g}_m^+[i]$ are the ITI response values, $a^+$ and $a^-$ are corresponding NRZ values for the adjacent tracks, and $\delta_m$ is a phase offset of the adjacent tracks relative to the desired track.

9. The method of claim 8, wherein the predetermined threshold is based on at least one of: (a) the maximum ITI response values for each adjacent track, and (b) the normalized ITI energy response of each adjacent track.

10. The method of claim 9, wherein:
the predetermined threshold based on the maximum ITI response values for each adjacent track is applied as a maximum of |$g_m[i]$|>$\theta_0$ for each adjacent track, where $\theta_0$ is the predetermined ITI threshold; and
the predetermined threshold based on the normalized ITI energy response of each adjacent track is applied as $E_0[m] \geq \theta_0$ for each adjacent track, where $\theta_0$ is the predetermined ITI threshold.

11. The method of claim 10, wherein $\theta 0=0.005$, thereby cancelling ITI from sectors containing greater than 8% ITI when the threshold is based on normalized ITI energy.

12. The method of claim 8, wherein the updated sample values are given by $\hat{y}_m[l] = y_m[l] - (\hat{r}_m^-[l] + \hat{r}_m^+[l])$, where $y_m[l]$ is the one or more groups of sample values generated by the finite impulse response filter, $\hat{r}_m^-[l]$ is the estimated ITI signal corresponding to the previous adjacent track, $\hat{r}_m^+[l]$ is the estimated ITI signal corresponding to the next adjacent track, and $\hat{y}_m[l]$ are the updated sample values provided to the iterative decoder.

13. The method of claim 1, further comprising:
providing updated sample values to an iterative decoder of the read channel; and
decoding, by the iterative decoder, the updated sample values to provide ITI cancelled data as output data of the read channel.

14. The method of claim 1, wherein, for the method the storage medium is a shingled magnetic recorded media.

15. The method of claim 1, wherein the method is implemented by a machine executing program code encoded on a non-transitory machine-readable storage medium.

16. A storage media controller for cancelling inter-track interference (ITI) in one or more sectors read from a desired track of a storage medium, the media controller comprising:
a read channel configured to read one or more sectors in a desired track of the storage medium;
a finite impulse response filter configured to generate one or more groups of sample values corresponding to each of the sectors;

an ITI canceller configured to estimate an un-normalized ITI response and an ITI signal associated with each sample value corresponding to (i) a next adjacent track and (ii) a previous adjacent track;

if the estimated ITI response of the previous adjacent track has reached a predetermined threshold, the ITI canceller is further configured to subtract the estimated ITI signal corresponding to the previous adjacent track for each sample value from each associated sample value of the desired track; and if the estimated ITI response of the next adjacent track has reached a predetermined threshold, the ITI canceller is further configured to subtract the estimated ITI signal corresponding to the next adjacent track for each sample value from each associated sample value of the desired track, wherein the estimated un-normalized ITI response for each group of samples is based on the sum of each sample value multiplied by a corresponding bit value for the corresponding adjacent track averaged over the number of samples included in each group of samples, and wherein the corresponding bit value for the corresponding adjacent track is adjusted for a phase offset between the corresponding adjacent track and the desired track;

if the estimated ITI response of the previous adjacent track has reached a predetermined threshold:

the estimated ITI signal corresponding to the previous adjacent track for each sample value is given by $$\hat{r}_m^-[l] = \sum_{i=-M}^{M} \tilde{g}_m^-[i] a^- [(m-1)L_b + l - i - \delta_m^-];$$

and if the estimated ITI response of the next adjacent track has reached a predetermined threshold:

the estimated ITI signal corresponding to the next adjacent track for each sample value is given by $$\hat{r}_m^+[l] = \sum_{i=-M}^{M} \tilde{g}_m^+[i] a^+ [(m-1)L_b + l - i - \delta_m^+];$$

wherein $l=1, 2, \ldots L_b$, where m is the sample block number, $\tilde{g}_m^-[i]$ and $\tilde{g}_m^+[i]$ are the ITI response values, $a^+$ and $a^-$ are corresponding NRZ values for the adjacent tracks, and $\delta_m$ is a phase offset of the adjacent tracks relative to the desired track.

17. The media controller of claim 16, wherein the ITI canceller is further configured to:

determine, within each group of sample values, (i) a maximum ITI response value corresponding to the previous adjacent track, and (ii) a maximum ITI response value corresponding to the next adjacent track; and provide the maximum ITI response values corresponding to each adjacent track.

18. The media controller of claim 17, wherein the ITI canceller is further configured to:

determine, based on the determined un-normalized ITI response value corresponding to the previous adjacent track and the un-normalized ITI response value corresponding to the next adjacent track, a normalized ITI energy for each respective adjacent track; and determine the normalized ITI response values by normalizing, by the number of samples in each sample group, the determined un-normalized ITI response value for each side track, the determined un-normalized ITI response value for each side track adjusted by the sample number and at least one adjustment factor.

19. The media controller of claim 18, wherein:

the predetermined threshold is based on at least one of: (a) the maximum ITI response values for each adjacent track, and (b) the normalized ITI energy of each adjacent track;

wherein the predetermined threshold based on the maximum ITI response values for each adjacent track is applied as a maximum of $|g_m[i]| > \theta_0$ for each adjacent track, where $\theta_0$ is the predetermined ITI threshold; and wherein the predetermined threshold based on the normalized ITI energy response of each adjacent track is applied as $E_0[m] \geq \theta_0$ for each adjacent track, where $\theta_0$ is the predetermined ITI threshold.

20. The media controller of claim 19, wherein $\theta_0 = 0.005$, thereby the ITI canceller is configured to cancel ITI from sectors containing greater than 8% ITI when the threshold is based on normalized ITI energy.

21. The media controller of claim 16, wherein:

the storage medium is a shingled magnetic recorded media;

the detected data is provided to a host device by at least one of a Small Computer System Interface ("SCSI") link, a Serial Attached SCSI ("SAS") link, a Serial Advanced Technology Attachment ("SATA") link, a Universal Serial Bus ("USB") link, a Fibre Channel ("FC") link, an Ethernet link, an IEEE 802.11 link, an IEEE 802.15 link, an IEEE 802.16 link, and a Peripheral Component Interconnect Express (PCI-E) link; and the media controller is implemented as an integrated circuit chip.

* * * * *